(No Model.) 2 Sheets—Sheet 1.
C. H. WITHAEGER.
MACHINE FOR HARVESTING CORN.
No. 603,307. Patented May 3, 1898.
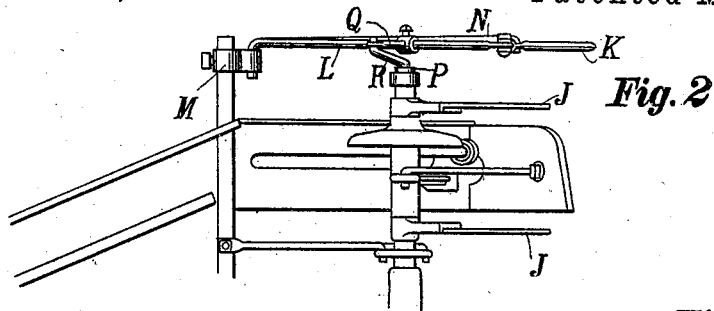
Fig. 2
Fig. 1
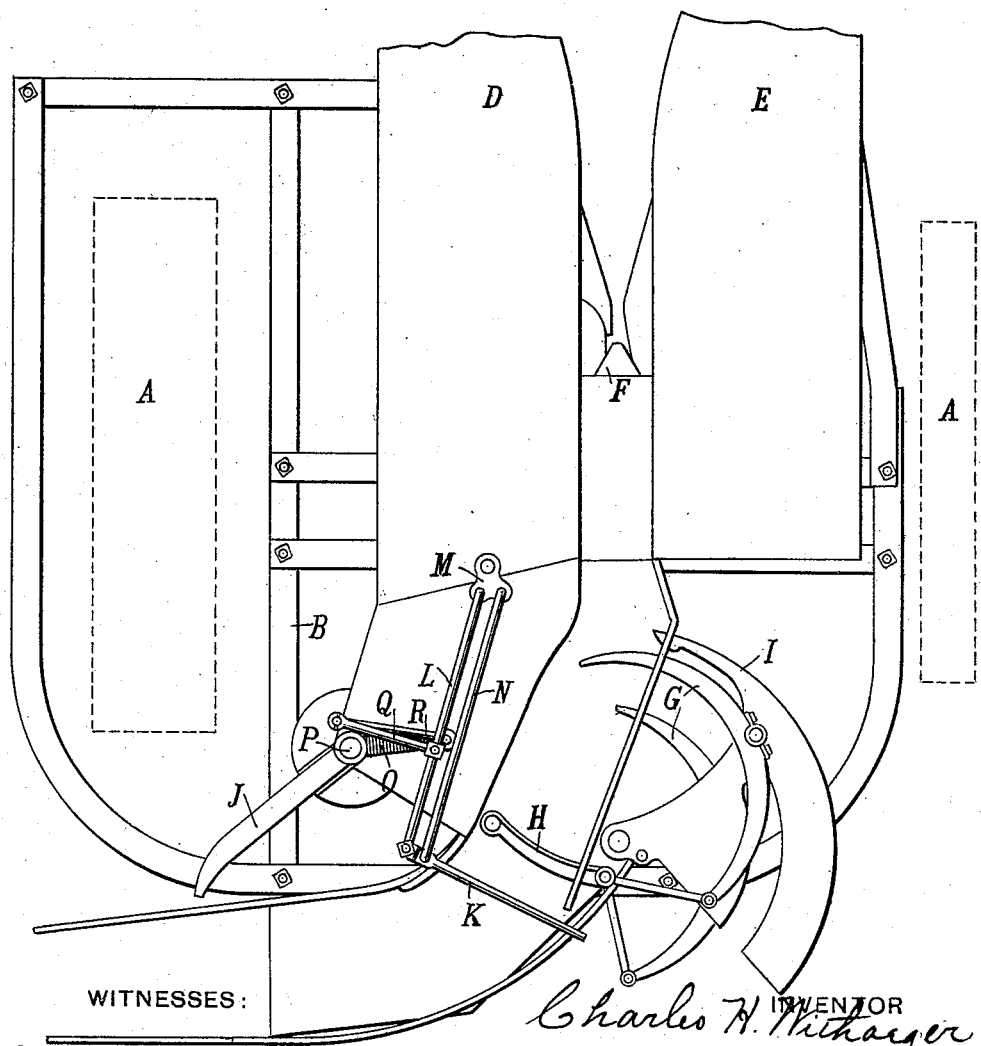
WITNESSES:
John M. Culver
Oscar Laederach
INVENTOR
Charles H. Withaeger
BY R. B. Swift
ATTORNEY.

(No Model.) 2 Sheets—Sheet 2.

C. H. WITHAEGER.
MACHINE FOR HARVESTING CORN.

No. 603,307. Patented May 3, 1898.

WITNESSES:
John M. Culver
Oscar Laederach

INVENTOR
Charles H. Withaeger
BY
R. B. Swift,
ATTORNEY.

UNITED STATES PATENT OFFICE.

CHARLES H. WITHAEGER, OF SCHAUMBERG, ILLINOIS, ASSIGNOR TO THE McCORMICK HARVESTING MACHINE COMPANY.

MACHINE FOR HARVESTING CORN.

SPECIFICATION forming part of Letters Patent No. 603,307, dated May 3, 1898.

Application filed April 28, 1897. Serial No. 634,194. (No model.)

*To all whom it may concern:*

Be it known that I, CHARLES H. WITHAEGER, a citizen of the United States, residing at Schaumberg, in the county of Cook and State of Illinois, have invented a new and useful Improvement in Machines for Harvesting Corn, of which the following is a specification.

My invention relates to an improvement in corn-harvesting machines in which forwardly-projecting prongs on each side of the corn-row support and guide the corn to a knife by which it is severed, and thence on into a binding attachment where the corn is bound while still standing on end; and the objects of my improvement are, first, to provide a support for the tops of the corn to hold the stalks in an upright position after the corn has been delivered to the binder; second, to provide means to actuate this support, and, third, to control and so time its movement as to cause it to remain in place while the bundle is being formed and to get out of the way when the bundle is discharged and to quickly return to position after the bundle is discharged. I attain these objects by the mechanism illustrated in the accompanying drawings, in which—

Figure 3:
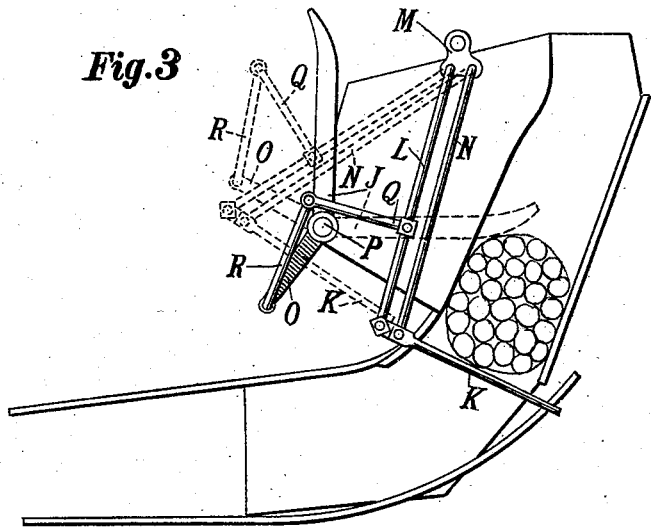
Figure 4:
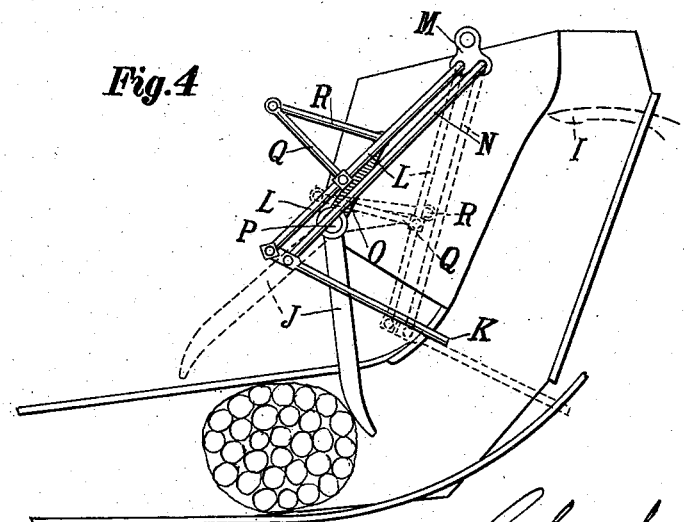

Figure 1 is a plan view of so much of the machine as is necessary to show my invention. Fig. 2 is a side view of the same. Fig. 3 shows in full lines the gate that is the subject of my invention in its normal position across the corn passage-way sustaining the tops of the bundle, while the discharge-arm makes about one-third of a revolution, and in dotted lines the discharge-arm is shown just starting the bundle, and the gate is out of the path of the outgoing bundle. Fig. 4 shows in full lines the discharge-arm having moved the bundle beyond the gate while it was out of the path of the bundle, and in dotted lines the gate is shown across the path, the distance between the full and dotted lines of the discharge-arm showing the short movement necessary to return the gate to its normal position.

Similar letters refer to similar parts throughout the several views.

The wheels A are represented by dotted lines, but it is to be understood that they are connected to the machine and support it and give motion to its operating devices. The frame B supports the upright binder, and forwardly-projecting prongs D on the side next to the main wheel and E on the side next to the grain-wheel project from this binder and form a corn passage-way. It is to be understood that there are gathering devices mounted upon these prongs that straighten the stalks and carry them onwardly across the knife F until they are grasped by the packers G, that carry them into the bundle-receptacle of the binder. Across the corn passage-way, in practically the same plane as the packers G, the trip and compressor finger H is positioned. This finger is positioned in practically the same horizontal plane as the needle I and serves as a stop against which the needle compresses the bundle as it encircles it with the band. When, however, the corn is tall and from the forward momentum of the machine the tops tend to fall to the rear, the weight of the heavy stalks will, if there is no stop above the trip and compressor finger H, cause the corn to fall upon it and start the binder into action before enough stalks have accumulated to form a bundle. The stalks will thus be tied while at an inclination, the tops to the rear and the butts nearer the knife, and when discharged by the discharge-arms J, which in their rotation sweep the corn passage-way, the top of the bundle will be carried to the rear; but the butts will not be pulled out, and soon the binding mechanism will become clogged. To remedy these difficulties, a gate is attached to the machine and positioned in a plane above that of the trip and compressor-finger so as to support the tops of the tall corn. The packers working near the butts of the stalks will thus carry the butts forward, and the tops being held the stalks will be straightened and a more compact and better bound bundle will thus be formed. Gates for this purpose have been made, but have failed, because they did not get out of the corn passage-way with sufficient rapidity and back into the passage-way in time to catch the tops of the oncoming stream after the discharge-arms had swept out the formed bundle. Other gates that have been actuated so that their retarding-arms swept up or down the stalks as the bundle was being discharged have been faulty, because they would tear the ears of corn from the stalks, while others have been so constructed that they could not be gotten back into the corn passage-way without grasping the straggling stalks of the outgoing bundle if in time to catch the tops of the oncoming stream.

My invention consists of a gate K, that is positioned in a plane above that of the trip H and slightly to the outer side thereof, and is pivoted to the supporting-arm L, which arm is in turn pivoted to a fixed part of the machine. In the drawings the part is the binder-supporting pipe M. Parallel with the supporting-arm L is another arm N, that is also pivoted to the binder-supporting pipe M. These two arms, with the gate K at practically a right angle thereto, thus form a stop that can be swung into and out of the corn passage-way. The parallelism of the supporting-arms move the gate into and out of the corn passage-way at practically a right angle to the direction of the passage-way. The gate K is, because of the parallelism of the arms, drawn forward slightly when it is pulled out of the corn passage-way and returns slightly in advance of its normal position. Were the gate K, however, rigidly attached at a right angle to one of the supporting-arms and the other removed the movement of the gate K, passing in and out of the passage-way, would be on the arc of a circle, and it would thus be very liable to catch any straggling stalks of the bundle that might be held back by entanglement with the corn still in the corn passage-way. The parallel movements of the supporting-arms, however, allow the gate to enter the corn passage-way so far from the outgoing bundle as to make this point safe.

It is desirable that gates of this kind remain across the corn passage-way until the gavel has been encircled by the needle and the bundle is about ready to be discharged. Then it is necessary that they should be quickly drawn from the corn passage-way and that they should remain out of the passage-way until the bundle has been swept onward, thus tearing the tops of the bundle from the swath that is held back by the needle, and that as the needle is about to be retracted, so as to allow the corn in the corn passage-way to be advanced, the gate be quickly returned to its former position across the corn passage-way. This is accomplished by a crank O, that is fixed to the knotter-shaft. Rigidly fastened to the supporting-arm L is an arm Q, extending practically at right angles thereto and ending just outside the center of the knotter-shaft were it extended. This arm Q is connected with the crank O by a connecting-rod R. When the binding mechanism is at rest and the bundle accumulating, the discharge-arms J, which are also mounted upon the knotting-shaft P, are at rest in the position shown in Fig. 1. When, however, the bundle has been accumulated and the binding mechanism started in operation, the rotation of the discharge-arm J and the crank O will, as shown in Fig. 3, have practically no effect upon the gate until the discharge-arm has made one-third of a revolution, at which time the position of the fixed arm Q and the crank O, which is connected thereto, is such as to rapidly withdraw the gate from across the corn passage-way, as shown in dotted lines in Fig. 3. The bundle is then discharged, and during the discharge operation, while the discharge-arms are sweeping the corn passage-way with the bundle, the gate remains open, receiving but a slight movement from the crank. When, however, as shown in Fig. 4, the bundle is nearly discharged, the last movement of the crank rapidly throws the gate across the corn passage-way.

Attention is called to the fact that the construction herein described is applicable in horizontal binders, in which the tops of the corn and grain tend to swing around, thus destroying the parallelism of the forming gavel. I do not, therefore, wish to limit myself with this device to vertical binders.

Having now described my invention, what I claim, and desire to secure by Letters Patent, is—

1. In combination in a harvesting-machine with a binder in which the gavel is received and formed into a bundle, a gate positioned across the passage-way of the outgoing bundle to support the heads of the grain, which gate is pivoted with two bars that are independently pivoted to the machine.

2. In combination in a self-binding harvester with a binder in which the gavel is accumulated, a gate to support the heads of the grain, which gate consists of an arm positioned in the path of the heads and pivoted to parallel bars that are independently pivoted to the machine, and means for actuating the gate whereby it is rapidly withdrawn from and projected across the grain passage-way.

3. In combination with a self-binding harvester a gate to support the heads of the grain while the gavel is being formed, consisting of an arm that is pivoted to parallel bars, which are in turn pivoted to the machine, an arm rigidly attached to one of these bars and extending when the gate is across the passage-way in proximity to the extended knotter-shaft, a crank on the knotter-shaft and a link connecting the crank on the knotter-shaft with the fixed arm of the gate, substantially as and for the purpose specified.

In witness whereof I have hereunto set my hand, this 15th day of January, 1897, in the presence of two witnesses.

CHARLES H. WITHAEGER.

Witnesses:
WM. L. SCHUMACHER,
R. B. SWIFT.